April 11, 1961 A. A. JORGENSEN 2,979,708
ANALOG TO DIGITAL CONVERTER
Filed Oct. 20, 1958
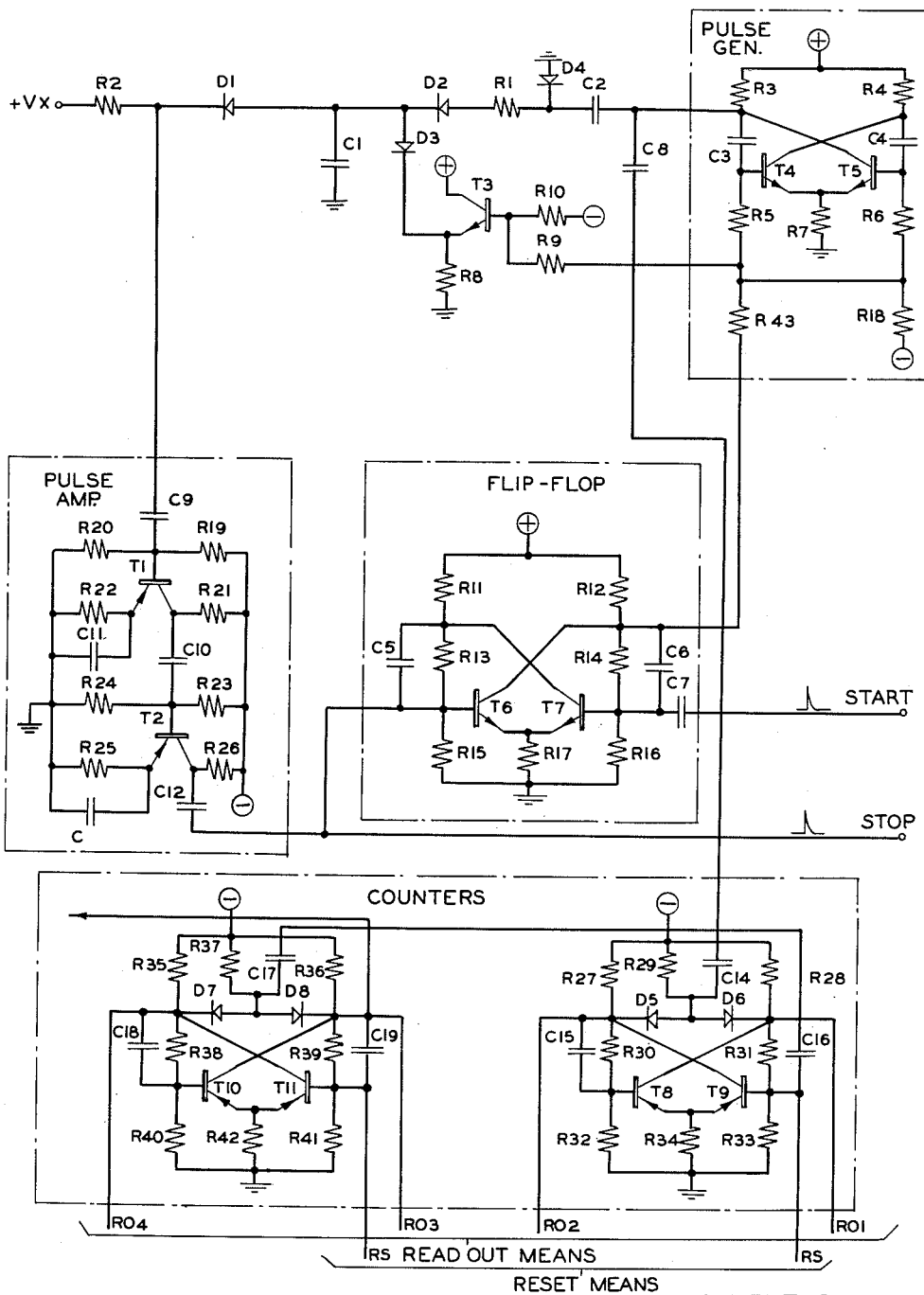
INVENTOR
ADAM A. JORGENSEN
ATTORNEY

United States Patent Office 2,979,708
Patented Apr. 11, 1961

2,979,708

ANALOG TO DIGITAL CONVERTER

Adam A. Jorgensen, Victor, N.Y., assignor to General Dynamics Corporation, Rochester, N.Y., a corporation of Delaware Filed Oct. 20, 1958, Ser. No. 768,430

3 Claims. (Cl. 340—347)

This invention relates to translating means for converting magnitudes varying over a continuous scale to magnitudes expressed by the nearest one of a series of incrementally increasing discrete quantities, and particularly for converting magnitudes which might be expressed by a meter such as a voltmeter into magnitudes which might be expressed by integers or whole numbers.

The object of the invention is to provide a link between an analog computer and a digital computer whereby magnitudes derived by analog computer means may be recorded for observation or for entry into a digital computer.

The invention consists of electronic circuit means whereby discrete increments of potential may be accumulated until a resulting potential of a given value has been reached, the increments being counted and the count attained then being recorded as a measure of the said given value. In a preferred embodiment of the invention, a conventional arrangement known as a dipper and bucket device is employed whereby a comparatively large capacity condenser is used as a storage reservoir and this is filled step by step until the level reached is the same as a potential offered for comparison. In accordance with this arrangement the act of offering the unknown potential for comparison will create a start pulse and the attainment in the bucket condenser of an equal potential will create a stop pulse. In between the start and stop pulses a dipper condenser will be operated to repeatedly charge to a standard potential and to then discharge into said bucket condenser, the number of such operations being counted and recorded whereby a discrete whole number may be derived to express the magnitude of such unknown potential.

In further more specific detail the invention consists of an input circuit to which an unknown potential may be connected and to which the terminal of a bucket condenser may also be connected, a diode being interposed between the said bucket condenser and the said input to prevent communication of the said unknown potential to the said bucket condenser but to allow the transmission of a pulse to said input when the potential accumulated by said bucket condenser reaches equality with the unknown potential applied thereto. There is then connected to this input a pulse amplifier such as a blocking oscillator or a single shot multivibrator which will pass these start and stop pulses to an on and off device, such as a flip-flop, to activate a pulse generator to transmit a series of pulses to a dipper condenser which delivers a corresponding series of charges to the said bucket condenser, the number of said pulses simultaneously being counted by a conventional open chain counter.

The drawings consist of a single sheet and a single figure in the form of a schematic circuit diagram of a preferred embodiment of the present invention.

The basic principle of the present invention very broadly stated of counting the number of small and standard charges delivered to a storage condenser to measure in numbers the value of the potential attained by the said storage condenser may be realized in several different ways being shown herein by transistor circuits.

The converter employs four basic component circuits each shown in a broken line rectangle and labelled Pulse Generator, Flip-Flop, Pulse Amplifier and Counters respectively, these generally well known and conventional devices being included in a complete circuit to provide a new combination to produce the desired result hereby sought. The pulse generator shown herein is in the form of a free running multivibrator, though other types of pulse generators might be used, such as a blocking oscillator, or a clipped sine wave generator. The flip-flop is a conventional bistable circuit and the pulse amplifier is conventional in design, shown with two stages of amplification though additional stages could be added if necessary for completely satisfactory operation. The counter shown is a conventional circuit chain of flip-flop stages, two stages being shown as representative of any given number which may be required.

In the operation of this device an unknown potential $V_x$, positive with respect to ground potential, is connected as an input before the resistor R2. At the moment a conversion is to take place a positive start pulse is applied to the start terminal. The start pulse places the flip-flop circuit with the transistor T7 in its conducting state and the transistor T6 in its non-conducting state. In this condition, the collector of transistor of T6 will attain a positive potential, almost equal to the positive supply voltage chosen for the circuit and which is indicated by the plus sign within a circle, connected to the collector of T6 through resistor R12. The collector of transistor T6 is connected to a resistor R43 connected to the junction of the resistors R5, R6, R9 and R18. The potential at this junction is controlled by the condition of the flip-flop circuit. Prior to the start pulse, the potential at this junction was kept at a negative value but the start pulse changed this to some positive value. When the potential was negative, the pulse generator was unable to oscillate and the transistor T3 was maintained in its non-conducting state. As long as transistor T3 was non-conducting, any positive potential that might have tended to build up on the condenser C1 would rapidly be discharged to ground through the diode D3 and the resistor R8 in the emitter circuit of T3. For reasons explained above, the start pulse will enable the transistor T3 to conduct and the pulse generator will start to oscillate. When T3 starts to conduct, its emitter will assume a positive potential higher than the unknown voltage $V_x$, and which will block the diode D3 in reverse direction, thus preventing any leakage of current from the condenser C1. When the pulse generator starts to oscillate, square wave shaped pulses of current will be sent through resistor R1 and the diode D2 into the condenser C1, which will be charged up in a step by step sequence. The resistor R1 must have a sufficiently large resistance to insure that the current value of the pulses remains constant disregarding the potential at the condenser C1. For the same reason, it is evident that the voltage amplitude of the pulses from the pulse generator must be large compared with the unknown voltage $V_x$ to be measured. Stated in other words, the circuit parameters are so designed that the condenser will be charged up in increments of voltage that remain constant at all times. When a high degree of accuracy is required, the resistor R1 may be replaced with a device that keeps the current constant, for example, a pentode tube with constant control and screen grid potential or a transistor in common base configuration. Each pulse will, besides increasing the potential on the condenser one increment, advance the pulse counter in one step. Assuming that the two first stages of the counter before the first pulse arrives have been brought in the condition that transistors T8 and T10 are in their conducting state while transistors T9 and T11 are in their non-conducting state, the first pulse from the pulse generator will cause the first stage to "flip," in other words, that T8 becomes non-conducting and T9 conducting. The second stage with transistors T10 and T11 will not be affected. The second pulse will cause the first stage to return to the start condition with T8 conducting and T9 non-conducting and the second stage will now "flip," caused by a positive going pulse from the collector of transistor T8 in stage number one when the latter "flopped" on the second pulse. The third pulse will cause the first stage to "flip" again but will not change the status of the second stage because this time the pulse from the collector of T8 is negative going. The fourth pulse will cause both the first and the second stage to "flop," but this time the third stage, which is not shown, will "flip" caused by a positive pulse from the collector of transistor T10. In this fashion, the binary counter will continue to register each new pulse with an ever increasing number of stages participating in the process of counting, while at the same time the potential on the condenser C1 continues to increase one step with each pulse until a certain moment when a pulse causes the potential on C1 to exceed the potential of the unknown voltage Vx. When this happens, the overshooting voltage will "pass through" the diode D1 and appear at the junction of R2 and D1 as a pulse of very low voltage. This pulse is, through a condenser C9, brought to the input terminal of the amplifier, and it will appear amplified at the stop output terminal, from which point, through the condenser C12, it is connected to the base of transistor T6 of the flip-flop circuit.

The amplified pulse, being of positive amplitude will cause the flip-flop to "flop," in other words, to revert to its condition before the arrival of the start pulse. In this condition, the pulse generator will stop oscillating and the transistor T3 will stop conducting, thus permitting the charge on the condenser C1 to escape to ground. The number of pulses that were generated by the pulse generator are now registered on the counter and this number represents the unknown voltage Vx in digital form. It still remains to "read out" the information stored in the counter. The type of read-out used is immaterial in this connection; it can be a visual display, a ticket printer, or a computer or, by way of example, a device such as that shown in the Patent 2,407,320 issued to O. R. Miller. The read-out equipment, however, may need a start pulse. For this purpose, the pulse from the amplifier to the flip-flop circuit which indicated the end of the conversion has also been connected to a terminal Stop, which provides a start signal for the read-out equipment. The read-out equipment is connected to the counter via the leads designated RO1, RO2 and so forth. When the read-out equipment has finished its task it will normally have to reset the counter, which can be done by connecting a positive pulse to the leads designated RS to the counter.

What is claimed is:

1. A means for establishing a count corresponding to the magnitude of a given explicit value of a continuous variable expressed by electrical potential, consisting of a storage condenser, means consisting of a free running multivibrator for producing and transmitting a series of pulses for raising the potential of said condenser through a series of incremental charges applied thereto, means for producing a start pulse, a pulse amplifier for producing a stop pulse, means consisting of a diode connected to said storage condenser for transmitting the first of said incremental charges from said multivibrator after said storage condenser has been charged to equality between the potential of said storage condenser and said explicit potential value of said pulse amplifier, a pulse counter, means responsive to said start pulse to enable said multivibrator to feed into said storage condenser circuit and simultaneously into said pulse counter and means responsive to said stop pulse to disable said multivibrator whereby the count attained by said counter will correspond to the potential reached by said storage condenser.

2. A means for establishing a count corresponding to the magnitude of a given explicit value of a continuous variable expressed by electrical potential, consisting of a network including a storage condenser and a storing condenser, a free running multivibrator for creating and transmitting a series of pulses to said storing condenser for further transmission by said storing condenser to said storage condenser, a pulse amplifier responsive to the application of the said electrical potential representing said explicit value thereto for transmitting a pulse to a flip-flop device for creating a start pulse, means responsive to the first of said pulses created and transmitted by said multivibrator to said storing condenser and thence to said storage condenser subsequent to the attainment by said storage condenser of a potential value equal to said electrical potential representing said explicit value for transmission to said pulse amplifier for transmitting another pulse to said flip-flop device for creating a stop pulse, said start and said stop pulses acting to start and to stop said free running multivibrator, and a counter responsive to said multivibrator.

3. A transistorized electronic analog to digital converter consisting of an input terminal to which an unknown potential may be applied and leading from said terminal a cascade circuit including a pulse amplifier, a flip-flop, a free running multivibrator and a dipper and bucket circuit, said pulse amplifier being responsive to each application of potential applied to said input terminal to translate said application into an amplified pulse for transmission into said flip-flop, said flip-flop being responsive to every other said amplified pulse to close an effective enabling circuit to said free running multivibrator, said dipper and bucket circuit consisting of a comparatively small condenser charged once each cycle of operation of said multivibrator and a comparatively large condenser for accumulating an increasing charge step by step by transference of the said charges from said small condenser, means including a diode connected between said large condenser and said input terminal biased by said unknown potential to prevent application of said accumulated charge of said large condenser to said input terminal until said accumulated charge equals and exceeds said unknown potential whereby said pulse amplifier creates and transmits another pulse to said flip-flop to stop the operation of said free running multivibrator, and counting means consisting of a cacade of flip-flop circuits, responsive to pulses transmitted from said multivibrator to said small condenser of said dipper and bucket circuit.

References Cited in the file of this patent
UNITED STATES PATENTS
2,761,968    Kuder _____ Sept. 4, 1956